US012088112B1

(12) United States Patent
Yi

(10) Patent No.: US 12,088,112 B1
(45) Date of Patent: Sep. 10, 2024

(54) WIRELESS CHARGER AND A CHARGING METHOD OF THE WIRELESS CHARGER

(71) Applicant: Guanyu(Dongguan) Intelligent Technology Co., Ltd, Dongguan (CN)

(72) Inventor: Shoufeng Yi, Yichun (CN)

(73) Assignee: Guanyu(Dongguan) Intelligent Technology Co., Ltd

(*) Notice: Subject to any disclaimer, the term of this patent is extended or adjusted under 35 U.S.C. 154(b) by 0 days.

(21) Appl. No.: 18/512,071

(22) Filed: Nov. 17, 2023

(51) Int. Cl.
| | |
|---|---|
| *H01M 10/46* | (2006.01) |
| *G04G 19/10* | (2006.01) |
| *H02J 50/00* | (2016.01) |
| *H02J 50/10* | (2016.01) |
| *H02J 50/40* | (2016.01) |
| *H04R 1/10* | (2006.01) |

(52) U.S. Cl.
CPC ............ *H02J 50/005* (2020.01); *G04G 19/10* (2013.01); *H02J 50/10* (2016.02); *H02J 50/402* (2020.01); *H04R 1/1025* (2013.01); *H04R 2420/07* (2013.01)

(58) Field of Classification Search
CPC ........ H02J 7/0042; H02J 50/005; H02J 50/10; H02J 50/12; H02J 50/402; G04G 19/10; H04R 2420/07; H04R 1/1025

USPC .......................... 320/107, 108, 114, 115, 116
See application file for complete search history.

(56) References Cited

U.S. PATENT DOCUMENTS

| | | | | |
|---|---|---|---|---|
| 2015/0069961 | A1* | 3/2015 | Chen ...................... | H02J 50/90 320/108 |
| 2016/0064987 | A1* | 3/2016 | Sheu ..................... | H02J 7/0042 320/108 |
| 2017/0222680 | A1* | 8/2017 | Yan ...................... | H04B 1/3883 |

FOREIGN PATENT DOCUMENTS

WO    WO-2019178648 A1 *  9/2019  .............. H02J 50/12

* cited by examiner

*Primary Examiner* — Edward Tso
(74) *Attorney, Agent, or Firm* — Jose Cherson Weissbrot

(57) ABSTRACT

A novel wireless charger comprises a charger bracket provided with a first charging module; a mobile phone charging panel provided with a second charging module; a watch charging panel provided with a third charging module; a base provided with a power jack; wherein, the base is provided with an electric slip ring, a gear is sleeved on the electric slip ring, and a clamping pin abutting against the gear is also arranged in the base; the charging method is as follows: a wirelessly-charged mobile phone is placed on the mobile phone charging panel, a wirelessly-charged watch is placed on the watch charging panel, and a wirelessly-charged earphone is placed on the charger bracket.

19 Claims, 15 Drawing Sheets

WIRELESS CHARGER AND A CHARGING METHOD OF THE WIRELESS CHARGER

TECHNICAL FIELD

The present invention relates to the technical field of chargers, in particular to a novel wireless charger and a charging method of the novel wireless charger.

BACKGROUND

As we all know, wireless charging technology originated from wireless power transmission technology. Among them, low-power wireless charging is often carried out by electromagnetic induction, for example, the Qi method for charging mobile phones. When in use, because energy is transmitted by magnetic field between the charger and the electric device, there is no wire connection between them, so it is very convenient, safe and reliable to use.

At present, the most popular field of wireless charging technology is mainly in the field of charging mobile phones. With the development of smart phone technology, smart phones have been widely used by people. Because of their small size, their internal batteries are also small. However, smart phones need to meet people's needs for making phone calls, connecting to the network, listening to music, watching videos and so on. Therefore, the power stored in smart phones is often used up by users in a short time, which means that users of smart phones need to charge their smart phones frequently. In this case, wireless charging technology is generally accepted by people for its unique convenience.

However, the traditional wireless charger has the problems of being unable to charge multiple devices at the same time and being unable to rotate. For example, a wireless charger disclosed in U.S. Pat. No. 12,541,177 has the problem that it can't charge multiple devices at the same time and can't rotate. Similarly, a wireless charger disclosed in U.S. Pat. No. 17,016,208 also has the problem that it cannot charge multiple devices at the same time and cannot rotate.

Based on the above problems, it is necessary for us to propose a new wireless charger and its charging method. The new wireless charger can rotate and charge a variety of wireless devices at the same time, providing users with more convenient product selection and more interesting use experience.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The present invention provides a novel wireless charger, which includes a charger bracket provided with a first charging module, wherein the charger bracket has a substantially C-shaped cross section: a mobile phone charging panel electrically connected with the charger bracket, wherein a second charging module is arranged on the mobile phone charging panel; wherein, the charger bracket is provided with a placing groove body which can accommodate the mobile phone charging panel, and the mobile phone charging panel is detachably arranged in the placing groove body: a watch charging panel inserted into the charger bracket and electrically connected with the charger bracket, wherein a third charging module is arranged on the watch charging panel: a base electrically connected with the charger bracket, wherein a power jack is arranged on the base, and the base is rotatably and electrically connected with the charger bracket:

wherein, the base comprises a transfer plate, a bearing is arranged on the transfer plate, and the charger bracket comprises a bracket plate, wherein a first circular slot and a second circular slot that are coaxial are arranged on the bracket plate and the transfer plate, and an electric slip ring is arranged on the bracket plate: the electric slip ring penetrates through the first circular slot and the second circular slot and is fixedly connected with the transfer plate.

The present invention also provides a novel wireless charger, which includes a charger bracket provided with a first charging module, wherein the charger bracket has a substantially C-shaped cross section: a mobile phone charging panel electrically connected with the charger bracket, wherein a second charging module is arranged on the mobile phone charging panel: wherein, the charger bracket is provided with a placing groove body which can accommodate the mobile phone charging panel, and the mobile phone charging panel is detachably arranged in the placing groove body: a watch charging panel inserted into the charger bracket and electrically connected with the charger bracket, wherein a third charging module is arranged on the watch charging panel: a base electrically connected with the charger bracket, wherein a power jack is arranged on the base, and the base is rotatably and electrically connected with the charger bracket:

wherein, the base comprises a transfer plate, a bearing is arranged on the transfer plate, the charger bracket comprises a bracket plate, a first circular slot and a second circular slot that are coaxial are arranged on the bracket plate and the transfer plate: an electric slip ring is arranged on the bracket plate, and the electric slip ring penetrates through the first circular slot and the second circular slot and is fixedly connected with the transfer plate;

wherein, a gear is arranged in the first circular slot, and a third circular slot capable of passing through the electric slip ring is arranged on the gear: the gear is sleeved on the electric slip ring through the third circular slot, and rotates along with the rotation of the base; and a clamping pin is arranged on the bracket plate, wherein the clamping pin abuts against the gear, and when the gear rotates, the clamping pin collides with the gear and makes a sound;

wherein the bracket plate is provided with a fixing block for fixing the clamping pin, the fixing block is provided with at least one fixing protrusion, and the clamping pin is provided with at least one fixing hole corresponding to the fixing protrusion: the clamping pin and the fixing block are detachably connected through the fixing protrusion and the fixing hole;

wherein, the bracket plate is formed with a first accommodating groove for accommodating the clamping pin and the fixing block, a clamping column is formed in the first accommodating groove, and a through hole corresponding to the clamping column is formed in the fixing block: the clamping pin and the fixing block are arranged in the first accommodating groove.

The present invention also provides a charging method of a novel wireless charger, which includes: providing a novel wireless charger, wherein the novel wireless charger comprises a charger bracket, wherein a first charging module is arranged on the charger bracket; a mobile phone charging panel electrically connected with the charger bracket, wherein a second charging module is arranged on the mobile phone charging panel, a placing groove body capable of accommodating the mobile phone charging panel is arranged on the charger bracket, and the mobile phone charging panel is detachably arranged in the placing groove body: a watch charging panel inserted into the charger bracket and electrically connected with the charger bracket, wherein a third charging module is arranged on the watch charging panel: a base electrically connected with the charger bracket, wherein a power jack is arranged on the base, and the base is rotatably and electrically connected with the charger bracket; and a wirelessly-charged mobile phone, a wirelessly-charged watch and wirelessly-charged earphones that need to be charged: a power supply for providing electricity for the novel wireless charger and a connecting power cord:

the charging method comprises the following steps:

connecting the power jack with the power supply through the power cord;

placing the wirelessly-charged mobile phone on the mobile phone charging panel, placing the wirelessly-charged watch on the watch charging panel, and placing the wirelessly-charged earphone on the charger bracket according to the needs of a user.

BRIEF DESCRIPTION OF DRAWINGS

In order to explain the technical scheme of this application more clearly, the drawings needed in the implementation will be briefly introduced below: Obviously, the drawings described below are only some implementations of this application. For those skilled in the art, other drawings can be obtained according to these drawings without creative work.

In the figures.

Figure 1:
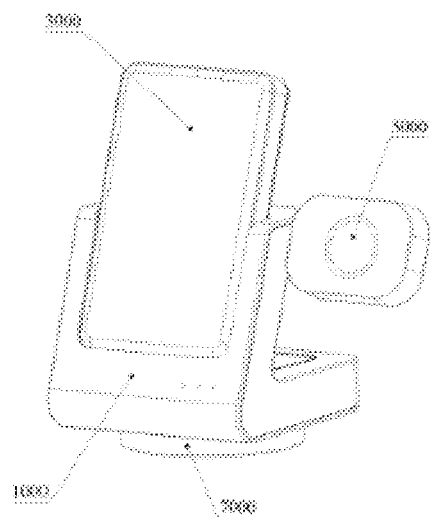
FIG. 1 is a schematic diagram of a new wireless charger.
Figure 2:
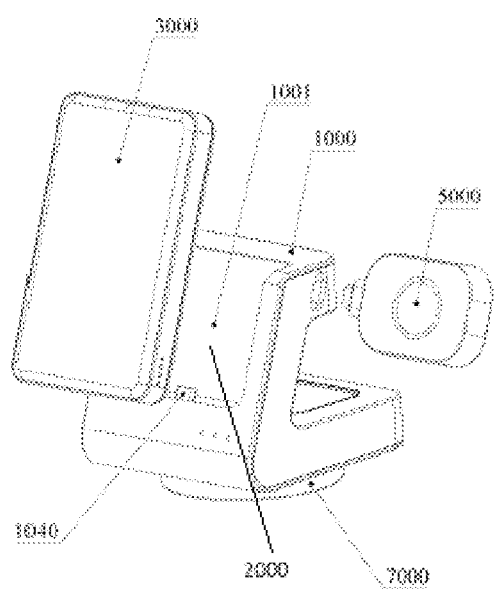
FIG. 2 is another schematic diagram of the novel wireless charger.
Figure 3:
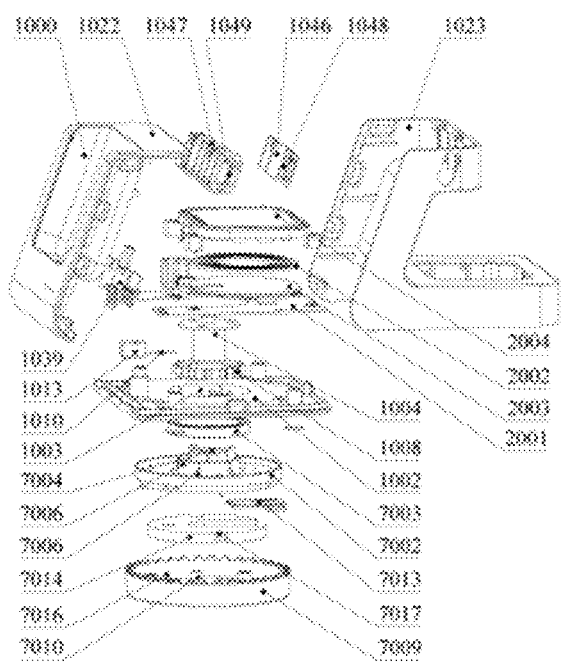
FIG. 3 is an exploded view of the charger bracket and base.
Figure 4:
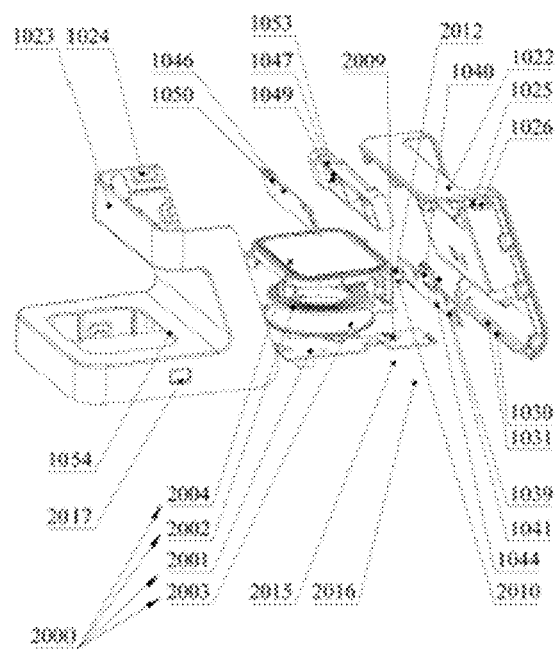
FIG. 4 is an exploded view of the charger bracket.
Figure 5:
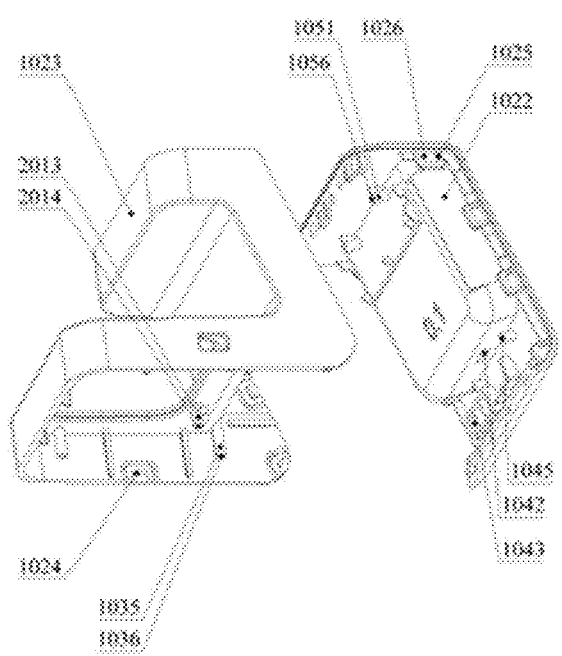
FIG. 5 is a schematic view of a bracket front plate and a bracket box body.
Figure 6:
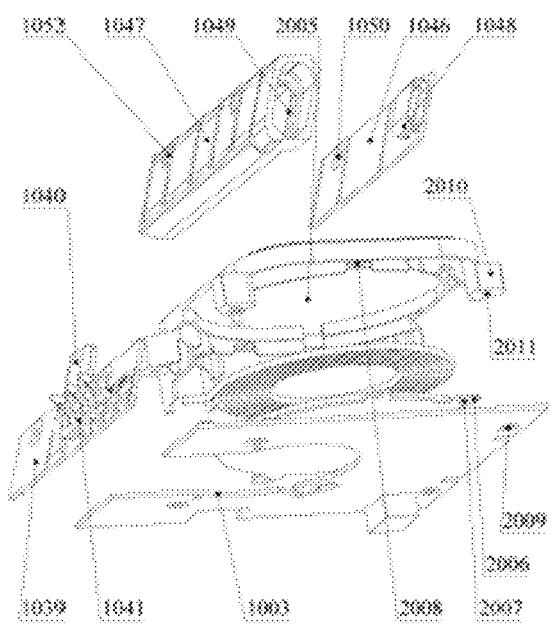
FIG. 6 is another schematic view of the charger bracket.
Figure 7:
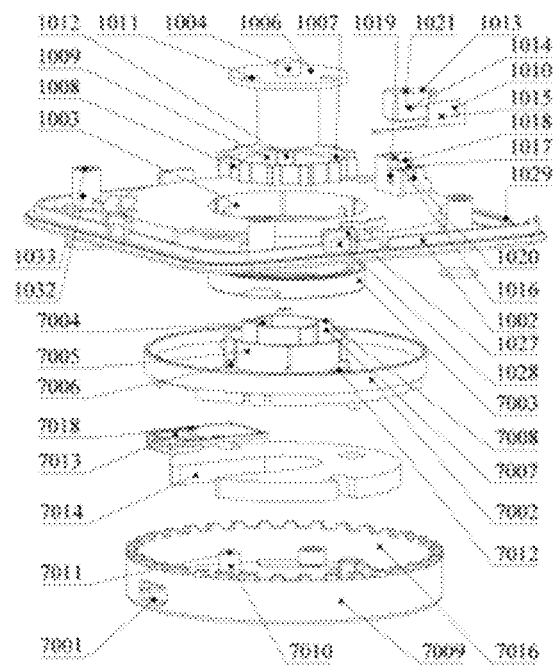
FIG. 7 is an exploded view of the base.
Figure 8:
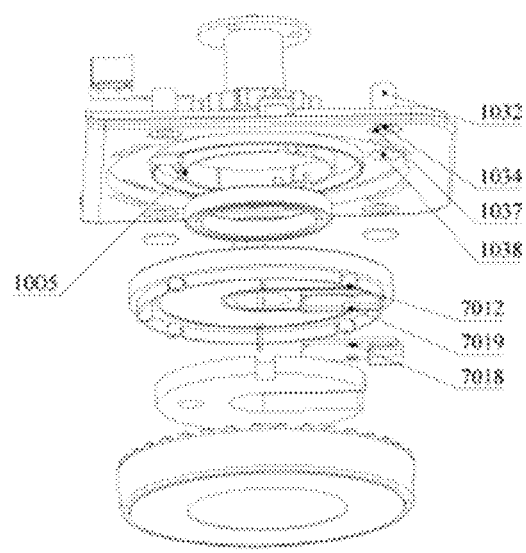
FIG. 8 is another schematic view of FIG. 7.

1000, Charger bracket; 1001, Placing groove body; 1002, Bracket plate; 1003, First circular slot; 1004, Electric slip ring; 1005, Second bearing ring platform; 1006, Disc part; 1007, Disc groove; 1008, Gear; 1009, Third circular slot; 1010, Clamping pin; 1011, Threaded hole N; 1012, Column groove; 1013, Fixing block; 1014, Fixing protrusion; 1015, Fixing hole; 1016, First accommodating groove; 1017, Clamping column; 1018, Through hole W; 1019, Clamping pin mouth; 1020, Clamping column groove; 1021, Screw hole O; 1022, Bracketfront plate; 1023, Bracket box body; 1024, First buckle protrusion; 1025, First buckle lug; 1026, First buckle groove; 1027, Second buckle lug; 1028, Second buckle groove; 1029, Second buckle protrusion; 1030, First buckle protruding part; 1031, Third buckle groove; 1032, Third connecting column; 1033, Second connecting groove; 1034, Through hole K; 1035, Fourth connecting column; 1036, Screw hole L; 1037, Screw cover groove; 1038, Screw groove cover; 1039, Second circuit board; 1040, First charging plug; 1041, First light-emitting element; 1042, First exposure port; 1043, Second exposure port; 1044, Threaded hole E; 1045, Threaded hole F; 1046, Third circuit board; 1047, Fitting plate; 1048, Fitting plate; 1049, First access port; 1050, Threaded hole G; 1051, Third fixing column; 1052, Fixing groove; 1053, Through hole H; 1054, Top cover opening; 1056, Screw hole X;

2000, First charging module; 2001, First circuit board; 2002, First coil assembly; 2003, First coil back plate; 2004, Top cover; 2005, Third accommodating groove; 2006, Back plate lug; 2007, Screw hole C; 2008, Threaded hole D; 2009, Screw hole R; 2010, Top connecting column; 2011, Screw hole S; 2012, First connecting groove; 2013, Second connecting column; 2014, Threaded hole T; 2015, First switch key; 2016, First power button; 2017, Third exposure port;

3000, Mobile phone charging panel; 3001, Mobile phone charging front panel; 3002, Mobile phone charging back plate; 3003, First protruding receiving groove; 3004, Fourth buckle groove; 3005, second buckle protruding part; 3006, Third buckle protrusion; 3007, First magnetic attraction piece; 3008, Second magnetic attraction piece; 3009, Fifth accommodating groove; 3010, Sixth accommodating groove;

4000, Second charging module; 4001, Fourth circuit board; 4002, Second coil assembly; 4003, Second coil back plate; 4004, Battery; 4005, Fourth accommodating groove; 4006, Second plug-in interface; 4007, Second switch key; 4008, Second light-emitting element; 4009, Second power button; 4010, Fourth exposure port; 4011, Second access port; 4012, Fifth exposure port; 4013, Screw hole I; 4014, Screw hole J; 4015, Third plug-in interface;

5000, Watch charging panel; 5001, Watch charging back plate; 5002, Watch charging front plate; 5003, Third buckle protruding part; 5004, Fifth buckle groove; 5005, Fourth buckle protrusion;

6000, Third charging module; 6001, Fifth circuit board; 6002, Third coil assembly; 6003, Third coil back plate; 6004, Fixing plate; 6005, Seventh accommodating groove; 6006, Abutment plate; 6007, Second charging plug; 6008, Charging plug accommodating part; 6009, Through hole U; 6010, Screw hole V; 6011, Coil groove; 6012, Third magnetic attraction piece; 6013, Fourth magnetic attraction piece; 6014, Frustum part; 6015, Fourth circular slot; 6016, Fifth circular slot;

7000, Base; 7001, Power jack; 7002, Transfer plate; 7003, Bearing; 7004, Second circular slot; 7005, Bearing spacer ring; 7006, First bearing ring platform; 7007, First connecting column; 7008, Threaded hole M; 7009, Base plate; 7010, First fixing column; 7011, Screw hole A; 7012, Screw hole B; 7013, Power receiver; 7014, Embedding block; 7016, Second accommodating groove; 7017, Embedding groove; 7018, Threaded hole P; 7019, Threaded hole Q.

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As shown in FIGS. 1 to 13, the present invention provides a novel wireless charger, which includes a charger bracket 1000, wherein a first charging module 2000 is arranged on the charger bracket 1000, and the charger bracket 1000 has a substantially C-shaped cross section; a mobile phone charging panel 3000 electrically connected with the charger bracket 1000, wherein a second charging module 4000 is arranged on the mobile phone charging panel 3000; wherein the charger bracket 1000 is provided with a placing groove body 1001 which can accommodate the mobile phone charging panel 3000, and the mobile phone charging panel 3000 is detachably arranged in the placing groove body 1001: a watch charging panel 5000 inserted into the charger bracket 1000 and electrically connected with the charger bracket 1000, wherein a third charging module 6000 is provided on the watch charging panel 5000: a base 7000 electrically connected to the charger bracket 1000, wherein a power jack 7001 is provided on the base 7000, and the base 7000 is rotatably electrically connected to the charger bracket 1000.

In this embodiment, the charger bracket 1000 has a cross-section that is substantially "C"-shaped. In other embodiments (not shown in the figures), the charger bracket is not limited to having a substantially "C"-shaped cross-section, but can also be set to a circular, rectangular, elliptical and other arbitrary geometric cross-sections.

In this embodiment, the base 7000 comprises a transfer plate 7002, a bearing 7003 is arranged on the transfer plate 7002, and the charger bracket 1000 comprises a bracket plate 1002, wherein a first circular slot 1003 and a second circular slot 7004 that are coaxial are arranged on the bracket plate 1002 and the transfer plate 7002, and an electric slip ring 1004 is arranged on the bracket plate 1002: the electric slip ring 1004 penetrates through the first circular slot 1003 and the second circular slot 1004 and is fixedly connected with the transfer plate 7002.

The transfer plate 7002 is provided with a bearing spacer ring 7005, the bearing spacer ring 7005 is provided with a first bearing ring platform 7006, the bracket plate 1002 is provided with a second bearing ring platform 1005 corresponding to the first bearing ring platform 7006, and the bearings 7003 are arranged on the first bearing ring platform 7006 and the second bearing ring platform 1005.

In this embodiment, a gear 1008 is arranged in the first circular slot 1003, and a third circular slot 1009 capable of passing through the electric slip ring 1004 is arranged on the gear 1008: the gear 1008 is sleeved on the electric slip ring 1004 through the third circular slot 1009, and rotates along with the rotation of the base 7000; and a clamping pin 1010 is arranged on the bracket plate 1002, wherein the clamping pin 1010 abuts against the gear 1008, and when the gear 1008 rotates, the clamping pin 1010 collides with the gear 1008 and makes a sound.

As shown in FIGS. 1 to 8, in this embodiment, the electric slip ring 1004 includes a disc part 1006, a disc groove 1007 for accommodating the disc part 1006 is provided on the gear 1008: at least one first connecting column 7007 is provided on the transfer plate 7002, a threaded hole M7008 is provided on the first connecting column 7007, and a threaded hole N corresponding to the threaded hole M7008 is provided on the disc part 1006: the electric slip ring 1004 and the transfer plate 7002 are fixedly connected by screws.

In this embodiment, three first connecting columns 7007 are provided on the transfer plate 7002. In other embodiments, the transfer plate 7002 is not limited to three first connecting columns 7007, but can also be provided with one, two, four, five and any desired number of first connecting columns 7007. The gear 1008 is provided with at least one column groove 1012 corresponding to the first connecting column 7007, and the gear 1008 is fitted with the transfer plate 7002 through the first connecting column 7007 and the column groove 1012, so that the gear 1008 rotates synchronously with the transfer plate 7002.

As shown in FIGS. 1 to 8, in this embodiment, the bracket plate 1002 is provided with a fixing block 1013 for fixing the clamping pin 1010, and the fixing block 1013 is provided with at least one fixing protrusion 1014: the clamping pin 1010 is provided with at least one fixing hole 1015 corresponding to the fixing protrusion 1014, and the clamping pin 1010 and the fixing block 1013 are detachably connected through the fixing protrusion 1014 and the fixing hole 1015.

In this embodiment, the bracket plate 1002 is formed with a first accommodating groove 1016 for accommodating the clamping pin 1010 and the fixing block 1013, a clamping column 1017 is formed in the first accommodating groove 1016, and a through hole W1018 corresponding to the clamping column 1017 is formed in the fixing block 1013: the clamping pin 1010 and the fixing block 1013 are arranged in the first accommodating groove 1016, wherein the first accommodating groove 1016 is provided with a clamping pin mouth 1019 exposing the clamping pin 1010 and a clamping column groove 1020 corresponding to the clamping column 1017.

The clamping column 1017 is provided with a screw hole O1021 corresponding to the through hole W, and the fixing block 1013 and the bracket plate 1002 are fixedly connected by screws. In other embodiments (not shown in the figures), the fixing block and the bracket plate are not limited to being fixedly connected by screws, but can also be connected by pins, rivets, welding and any desirable connection methods.

As shown in FIGS. 1 to 8, in this embodiment, the base 7000 includes a base plate 7009, on which there is at least one first fixing column 7010; the first fixing column 7010 is provided with a screw hole A7011, and the transfer plate 7002 is provided with at least one screw hole B7012 corresponding to the screw hole A7011: the base plate 7009 and the transfer plate 7002 are fixedly connected by screws.

In this embodiment, the base plate 7009 and the transfer plate 7002 are fixedly connected by screws. In other embodiments (not shown in the figures), the base plate and the transfer plate are not limited to being fixedly connected by screws, but can also be connected by pins, rivets, welding and any other desirable connection methods.

As shown in FIGS. 1 to 8, in this embodiment, the base 7000 includes a power receiver 7013 and an embedding block 7014 which can accommodate the power receiver 7013 and the electric slip ring 1004. The base plate 7009 is provided with a power jack 7001 corresponding to the power receiver 7013 and a second accommodating groove 7016 which can accommodate the embedding block 7014: the embedding block 7014 is provided with at least one embedding groove 7017 corresponding to the first fixing column 7010, and the embedding block 7014 is arranged in the second accommodating groove 7016.

In this embodiment, the power receiver 7013 is designed as a Type-C interface. In other embodiments (not shown in the figures), the power receiver is not limited to the Type-C interface, but also can be set to the conductive spring pin, Type-A, Type-B, Mini USB, Lightning, Micro USB and USB, and other desirable power receiver styles.

The power receiver 7013 is provided with at least one threaded hole P7018, and the transfer plate 7002 is provided with at least one threaded hole Q7019 corresponding to the threaded hole P7018, wherein the power receiver 7013 and the transfer plate 7002 are fixedly connected by screws. In other embodiments (not shown in the figures), the power receiver and the transfer plate are not limited to being fixedly connected by screw connection, but can also be connected by pin connection, rivet connection, welding and any desirable connection modes.

As shown in FIGS. 1 to 8, in this embodiment, the first charging module 2000 includes a first circuit board 2001, a first coil assembly 2002, a first coil back plate 2003 for fixing the first coil assembly 2002, and a top cover 2004 detachably connected with the first circuit board 2001:

wherein the top cover 2004 is provided with a third accommodating groove 2005 for accommodating the first coil assembly 2002 and the first coil back plate 2003: the top cover 2004 covers the first coil assembly 2002 and the first coil back plate 2003. The first coil back plate 2003 is provided with at least one back plate lug 2006, which is provided with a screw hole C2007, and the top cover 2004 is provided with at least one threaded hole D2008 corresponding to the screw hole C2007. The first coil back plate 2003 and the top cover 2004 are fixedly connected by screws.

As shown in FIGS. 1 to 8, in this embodiment, the charger bracket 1000 includes a bracket front plate 1022 and a bracket box body 1023 corresponding to the bracket front plate 1022. The bracket box body 1023 is provided with at least one first buckle protrusion 1024, and the bracket front plate 1022 is provided with at least one first buckle lug 1025 corresponding to the first buckle protrusion 1024: the first buckle lug 1025 is provided with a first buckle groove 1026 corresponding to the first buckle protrusion 1024, wherein the bracket box body 1023 and the bracket front plate 1022 are detachably connected by buckling.

Wherein, the bracket plate 1002 is provided with a second buckle lug 1027 corresponding to the first buckle protrusion 1024, and a second buckle groove 1028 corresponding to the first buckle protrusion 1024 is provided on the second buckle lug 1027, wherein the bracket plate 1002 and the bracket box body 1023 are detachably connected by buckling.

Wherein, the bracket plate 1002 is provided with a second buckle protrusion 1029, the bracket front plate 1022 is provided with a first buckle protrusion 1030 corresponding to the second buckle protrusion 1029: the first buckle protrusion 1030 is provided with a third buckle groove 1031 corresponding to the second buckle protrusion 1029, wherein the bracket front plate 1022 and the bracket plate 1002 are detachably connected by buckling.

In this embodiment, the bracket box body 1023 is detachably connected with the bracket front plate 1022 by buckling, the bracket plate 1002 and the bracket box body 1023 are detachably connected by buckling, and the bracket front plate and the bracket plate 1002 are detachably connected by buckling. In other embodiments (not shown in the figures), the connection mode is not limited to snap connection, but can also be set to screw connection, pin connection, rivet connection, welding and other connection modes as desired.

As shown in FIGS. 1 to 8, in this embodiment, the first circuit board 2001 is provided with a screw hole R2009, the top cover 2004 is provided with a top connecting column 2010 corresponding to the screw hole R2009; the top connecting column 2010 is provided with a screw hole S2011 corresponding to the screw hole R2009, and the top connecting column 2010 is also provided with a first connecting groove 2012 corresponding to the screw hole S2011. The bracket box body 1023 is provided with a second connecting column 2013 corresponding to the first connecting groove 2012, and a threaded hole T2014 corresponding to the screw hole S2011 is provided on the second connecting column 2013, wherein the bracket box body 1023, the first circuit board 2001 and the top cover 2004 are fixedly connected by screws.

In other embodiments (not shown in the figures), the bracket box body, the first circuit board and the top cover are not limited to being fixedly connected by screws, and the first circuit board and the top cover can also be connected by pins, rivets, welding and any desirable connection methods.

In this embodiment, the bracket plate 1002 is provided with a third connecting column 1032, the third connecting column 1032 is provided with a second connecting groove 1033, and a through hole K1034 is provided on the second connecting groove 1033: a fourth connecting post 1035 corresponding to the second connecting groove 1033 is provided on the bracket box body 1023, and a screw hole L1036 corresponding to the through hole K1034 is provided on the fourth connecting post 1035, wherein the bracket column and the bracket box body 1023 are fixed by screws. Wherein, the bracket plate 1002 is provided with a screw cover groove 1037 corresponding to the through hole K1034 on the side facing away from the third connecting column 1032, and a screw cover 1038 corresponding to the screw cover groove 1037 is provided on the screw cover groove 1037.

In this embodiment, the bracket column and the bracket box body 1023 are fixedly connected by screws. In other embodiments (not shown in the figures), the bracket column and the bracket box body are not limited to being fixedly connected by screws, but can also be connected by pins, rivets, welding and any other desirable connection methods.

As shown in FIGS. 1 to 8, in this embodiment, the charger bracket 1000 includes a bracket front plate 1022 and a bracket box body 1023 corresponding to the bracket front plate 1022, and the placing groove body 1001 is arranged on the bracket front plate 1022: a second circuit board 1039 is arranged in the charger bracket 1000, and a first charging plug 1040 and a first light-emitting element 1041 are arranged on the second circuit board 1039; a first exposure port 1042 corresponding to the first charging plug 1040 and a second exposure port 1043 corresponding to the first light-emitting element 1041 are arranged on the placing groove body 1001, and the first charging plug 1040 penetrates through the first exposure port 1042.

In this embodiment, the first charging plug 1040 is set as a Type-C charging plug. In other embodiments (not shown in the figures), the first charging plug is not limited to being set as a Type-C charging plug, but can also be set as a conductive spring pin, a Type-A, a Type-B, a Mini USB, a Lightning, a Micro USB, a USB and other types of charging plugs as desired. In this embodiment, the second circuit board 1039 is provided with at least one threaded hole E1044, and the bracket front plate 1022 is provided with at least one threaded hole F1045 corresponding to the threaded hole E1044, and the second circuit board 1039 and the bracket front plate 1022 are fixedly connected by screws. In other embodiments (not shown in the figures), the second circuit board and the bracket front plate are not limited to being fixedly connected by screws, but can also be connected by pins, rivets, welding and any desirable connection methods.

As shown in FIGS. 1 to 8, in this embodiment, a third circuit board 1046 and a fitting plate 1047 fixedly connected with the third circuit board 1046 are arranged on the top of the charger bracket 1000, and a first plug-in interface 1048 is arranged on the third circuit board 1046, and a first access port 1049 corresponding to the first plug-in interface 1048 is arranged on the fitting plate 1047:

wherein, the third circuit board 1046 is provided with at least one threaded hole G1050, the bracket front plate 1022 is provided with at least one third fixing column 1051 corresponding to the threaded hole G1050 and at least one screw hole X1056 corresponding to the threaded hole G1050: the fitting plate 1047 is provided with a fixing groove 1052 corresponding to the third fixing column 1051 and a through hole H1053 corresponding to the threaded hole G1050, wherein the third circuit board 1046, the fitting plate 1047 and the bracket front plate 1022 are fixedly connected by screws.

In this embodiment, the first plug-in interface 1048 is set as a Type-C interface. In other embodiments (not shown in the figures), the first plug-in interface is not limited to being set as a Type-C interface, but can also be set as a Type-A, Type-B, Mini USB, Lightning, Micro USB, USB and other interfaces of desired models.

In other embodiments (not shown in the figures), the third circuit board, the fitting plate and the bracket front plate are not limited to being fixedly connected by screws, but can also be connected by pins, rivets, welding, snap connection and any desirable connection modes.

As shown in FIGS. 1 to 8, in this embodiment, a first switch key 2015 is provided on the first circuit board 2001, a first power button 2016 corresponding to the first switch key 2015 and a third exposure port 2017 corresponding to the first power button 2016 are provided on the bracket box body 1023, wherein the first power button 2016 penetrates through the third exposure port 2017, and the bracket box body 1023 is also provided with a top cover opening 1054 corresponding to the top cover 2004, and the top cover 2004 penetrates through the top cover opening 1054.

Figure 9:
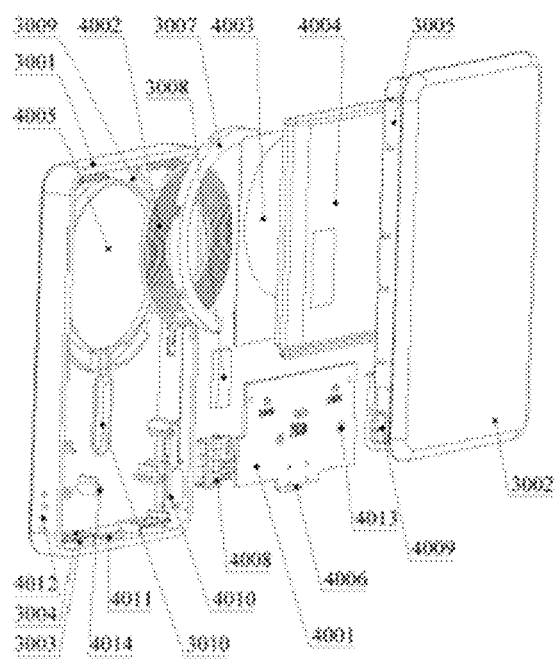
FIG. 9 is an exploded view of the mobile phone charging panel.
Figure 10:
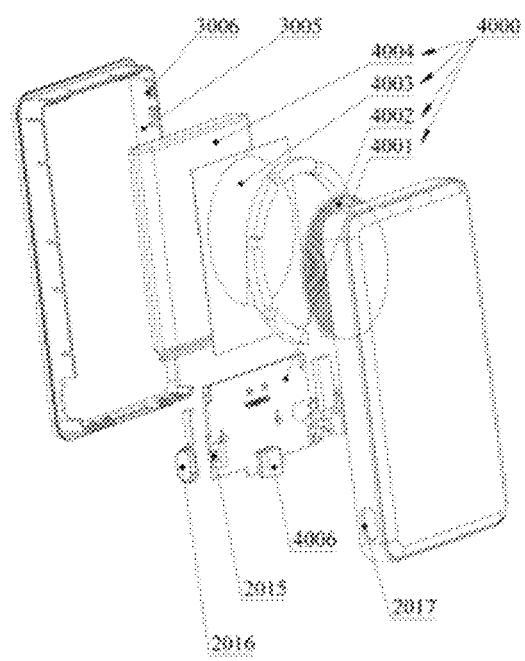
FIG. 10 is another view of FIG. 9.

As shown in FIGS. 9 to 10, in this embodiment, the mobile phone charging panel 3000 includes a mobile phone charging front plate 3001 and a mobile phone charging back plate 3002 corresponding to the mobile phone charging front plate 3001, wherein at least one first protruding receiving groove 3003 is arranged on the mobile phone charging front plate 3001, and at least one fourth buckle groove 3004 is arranged on the first protruding receiving groove 3003. At least one second buckle protruding part 3005 corresponding to the first protruding receiving groove 3003 is arranged on the mobile phone charging back plate 3002, and at least one third buckle protruding part 3006 corresponding to the fourth buckle groove 3004 is arranged on the second buckle protruding part 3005, wherein the mobile phone charging front plate 3001 and the mobile phone charging back plate 3002 are detachably connected by snap connection.

In other embodiments (not shown in the figures), the mobile phone chargingfront plate and the mobile phone charging back plate are not limited to being detachably connected by snap connection, but can also be connected by screw connection, pin connection, rivet connection, welding and any desirable connection mode.

As shown in FIGS. 9 to 10, in this embodiment, the second charging module 4000 includes a fourth circuit board 4001, a second coil assembly 4002, a second coil back plate 4003 for fixing the second coil assembly 4002, and a storage battery 4004. A fourth accommodating groove 4005 for accommodating the second coil assembly 4002 and the second coil back plate 4003 is provided on the mobile phone charging front plate 3001, and the second coil assembly 4002 and the second coil back plate 4003 are disposed in the fourth accommodating groove 4005.

As shown in FIGS. 9 to 10, in this embodiment, the fourth circuit board 4001 is provided with a second plug-in interface 4006, a second switch key 4007, and a second light-emitting element 4008: the mobile phone charging front plate 3001 is provided with a second power button 4009 corresponding to the second switch key 4007, a fourth exposure port 4010 corresponding to the second power button 4009, a second access port 4011 corresponding to the second plug-in interface 4006 and a fifth exposure port 4012 corresponding to the second light-emitting element 4008.

In this embodiment, the second plug-in interface 4006 is set as a Type-C interface. In other embodiments (not shown in the figures), the second plug-in interface is not limited to being set as a Type-C interface, but can also be set as a Type-C, Type-A, Type-B, Mini USB, Lightning, Micro USB, USB and other interfaces with desired models. At least one screw hole 14013 is set on the fourth circuit board 4001, and at least one screw hole J4014 corresponding to the screw hole 14013 is set on the mobile phone charging front plate 3001. The fourth circuit board 4001 and the mobile phone charging front plate 3001 are fixedly connected by screws.

In other embodiments (not shown in the figures), the fourth circuit board and the mobile phone charging front plate are not limited to being fixedly connected by screws, but can also be arranged by snap connection, pin connection, rivet connection, welding and any other desirable connection methods.

As shown in FIGS. 9 to 10, in this embodiment, a first magnetic attraction piece 3007 and a second magnetic attraction piece 3008 are further arranged on the mobile phone charging front plate 3001, and the mobile phone charging front plate 3001 is formed with a fifth accommodating groove 3009 and a sixth accommodating groove 3010 for accommodating the first magnetic attraction piece 3007 and the second magnetic attraction piece 3008, wherein the first magnetic attraction piece 3007 is arranged in the fifth accommodating groove 3009, and the second magnetic attraction piece 3008 is arranged in the sixth accommodating groove 3010.

Figure 11:
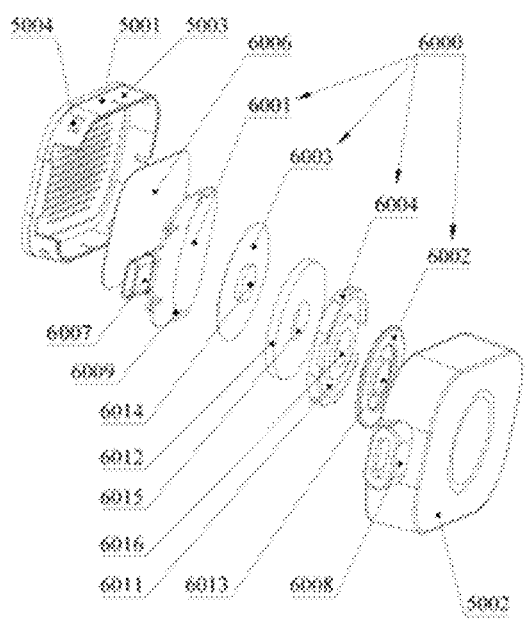
FIG. 11 is an exploded view of the watch charging panel.
Figure 12:
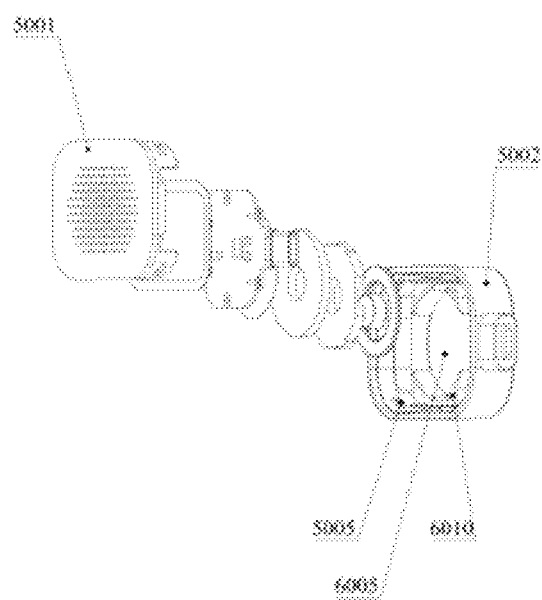
FIG. 12 is another view of FIG. 11.
Figure 13:
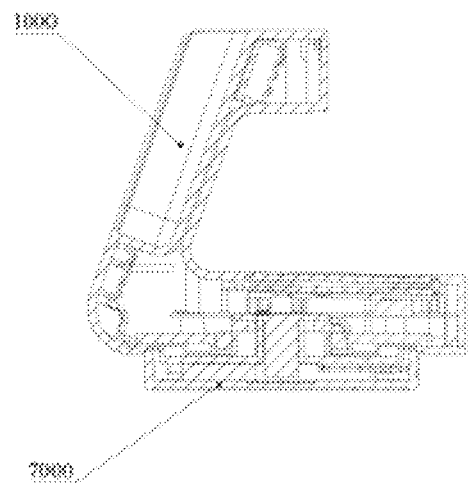
FIG. 13 is a sectional view of the charger bracket and base.

As shown in FIGS. 11 to 12, in this embodiment, the watch charging panel 5000 includes a watch charging front plate 5002 and a watch charging back plate 5001 corresponding to the watch charging front plate 5002, and at least one third buckle protruding part 5003 is provided on the watch charging back plate 5001: at least one fifth buckle groove 5004 is provided on the third buckle protruding part 5003. The watch charging front plate 5002 is provided with a fourth buckle protrusion 5005 corresponding to the fifth buckle groove 5004, wherein the watch charging front plate 5002 and the watch charging back plate 5001 are detachably connected by buckling.

As shown in FIGS. 11 to 12, in this embodiment, the third charging module 6000 includes a fifth circuit board 6001, a third coil assembly 6002, a third coil back plate 6003, and a fixing plate 6004 for fixing the third coil assembly 6002. The fixing plate 6004 is provided with a coil groove 6011, and the third coil assembly 6002 is arranged in the coil groove 6011.

As shown in FIGS. 11 to 12, in this embodiment, the watch charging panel 5000 further includes a third magnetic attraction piece 6012 and a fourth magnetic attraction piece 6013. The fixing plate 6004 and the third magnetic attraction piece 6012 are provided with a fourth circular slot 6015 and a fifth circular slot 6016 that are coaxial, and the third coil back plate 6003 is provided with a frustum part 6014: the frustum part 6014 and the fourth magnetic attraction piece 6013 penetrate into the fourth circular slot 6015 and the fifth circular slot 6016.

Wherein, the watch charging front plate 5002 is provided with a seventh accommodating groove 6005 for accommodating the third coil assembly 6002, the third coil back plate 6003, the fixing plate 6004, the third magnetic attraction piece and the fourth magnetic attraction piece, and the third coil assembly 6002, the third coil back plate 6003, the fixing plate 6004, the third magnetic attraction piece 6012 and the fourth magnetic attraction piece 6013 are arranged in the seventh accommodating groove.

As shown in FIGS. 11 to 12, in this embodiment, a regular circular through-hole pattern is arranged on the watch charging back plate 5001, and an abutment plate 6006 is also arranged, and the abutment plate 6006 is closely attached to the watch charging back plate 5001; wherein, the fifth circuit board 6001 is provided with a second charging plug 6007, and the watch charging front plate 5002 is provided with a charging plug accommodating part 6008 which allows the second charging plug 6007 to pass through, and the second charging plug 6007 penetrates through the charging plug accommodating part 6008, wherein the second charging plug 6007 and the charging plug accommodating part 6008 correspond to the first plug-in interface 1048 and the first access port 1049.

In this embodiment, the watch charging back plate 5001 is provided with a regular circular through hole pattern. In other embodiments (not shown in the figure), the charged watch charging back plate is not limited to being provided with a regular circular through hole pattern, but is also provided with an oval, a rectangle, an arc and any desirable geometric shape.

In this embodiment, the second charging plug 6007 is set as a Type-C charging plug. In other embodiments (not shown in the figure), the second charging plug is not limited to being set as a Type-C charging plug, but can also be set as a Type-A, Type-B, Mini USB, Lightning, Micro USB, USB and other types of charging plugs as desired.

As shown in FIGS. 11 to 12, in this embodiment, the fifth circuit board 6001 is provided with at least one through hole U6009, and the watch charging front plate 5002 is provided with at least one screw hole V6010 corresponding to the through hole U6009, and the fifth circuit board 6001 and the watch charging front plate 5002 are fixedly connected by screws. In other embodiments (not shown in the figures), the fifth circuit board and the watch charging front plate are not limited to being fixedly connected by screws, but can also be arranged by snap connection, pin connection, rivet connection, welding and any other desirable connection methods.

Figure 14:
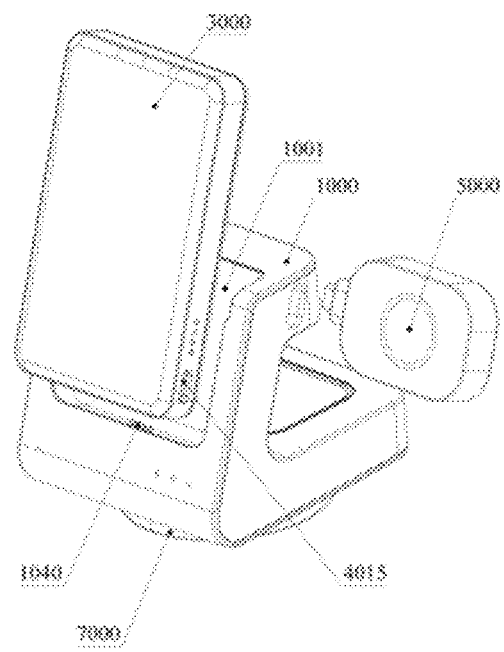
FIG. 14 is a schematic diagram of another embodiment of the new wireless charger.
Figure 15:
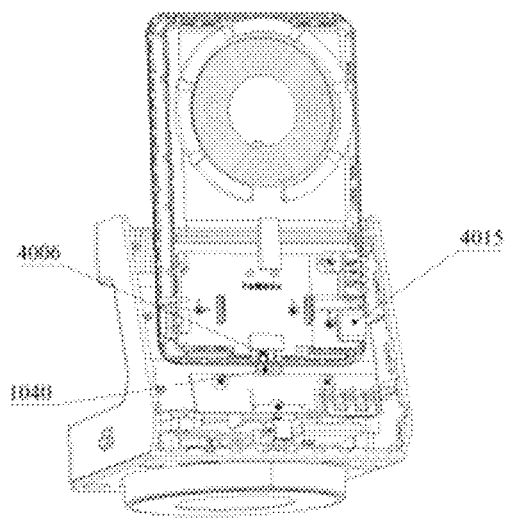
FIG. 15 is a segmented view of the wireless charger in FIG. 14.

As shown in FIGS. 14 to 15, it is another embodiment provided by the present invention, and the difference between this embodiment and the above embodiment is that:

in this embodiment, the first charging plug 1040 is set as a conductive spring pin, the second plug-in interface 4006 is set as a conductive spring pin connection hole, and the fourth circuit board 4001 is also set with a third plug-in interface 4015.

In this embodiment, the third plug-in interface is set as a Type-C interface. In other embodiments (not shown in the figures), the third plug-in interface is not limited to being set as a Type-C interface, but can also be set as a Type-A, Type-B, Mini USB, Lightning, Micro USB, USB and other interfaces of desired models.

Wherein, the second plug-in interface 4006 is arranged directly below the watch charging panel 5000, and the third plug-in interface 4015 is arranged at the lower end of the side of the watch charging panel 5000. In other embodiments (not shown in the figures), the second plug-in interface is not limited to being located directly below the watch charging panel, and the third plug-in interface is not limited to being located at the lower end of the side of the watch charging panel, and can also be located at any desired position.

The present invention provides a charging method of a novel wireless charger, which includes the following steps: providing a novel wireless charger, wherein the novel wireless charger comprises a charger bracket, wherein a first charging module is arranged on the charger bracket: a mobile phone charging panel electrically connected with the charger bracket, wherein a second charging module is arranged on the mobile phone charging panel, a placing groove body capable of accommodating the mobile phone charging panel is arranged on the charger bracket, and the mobile phone charging panel is detachably arranged in the placing groove body; a watch charging panel inserted into the charger bracket and electrically connected with the charger bracket, wherein a third charging module is arranged on the watch charging panel: a base electrically connected with the charger bracket, wherein a power jack is arranged on the base, and the base is rotatably and electrically connected with the charger bracket; and a wirelessly-charged mobile phone, a wirelessly-charged watch and wirelessly-charged earphones that need to be charged: a power supply for providing electricity for the novel wireless charger and a connecting power cord:

the charging method comprises the following steps:
connecting the power jack with the power supply through the power cord;
placing the wirelessly-charged mobile phone on the mobile phone charging panel, placing the wirelessly-charged watch on the watch charging panel, and placing the wirelessly-charged earphone on the charger bracket according to the needs of a user.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The terms "comprising." "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. A wireless charger, comprising:
a charger bracket provided with a first charging module, wherein the charger bracket has a substantially C-shaped cross section; and
a mobile phone charging panel electrically connected with the charger bracket, wherein a second charging module is arranged on the mobile phone charging panel; and
wherein, the charger bracket is provided with a placing groove body, the placing groove body accommodates the mobile phone charging panel, and the mobile phone charging panel is detachably arranged in the placing groove body; and
a watch charging panel inserted into the charger bracket and electrically connected with the charger bracket, wherein a third charging module is arranged on the watch charging panel; and
a base electrically connected with the charger bracket, wherein a power jack is arranged on the base, and the base is rotatably and electrically connected with the charger bracket; and
wherein, the base comprises a transfer plate, a bearing is arranged on the transfer plate, and the charger bracket comprises a bracket plate, wherein a first circular slot and a second circular slot that are coaxial are arranged on the bracket plate and the transfer plate, and an electric slip ring is arranged on the bracket plate; and the electric slip ring penetrates through the first circular slot and the second circular slot and is fixedly connected with the transfer plate.

2. The wireless charger according to claim 1, wherein a gear is arranged in the first circular slot, and a third circular slot capable of passing through the electric slip ring is arranged on the gear; and the gear is sleeved on the electric slip ring through the third circular slot, and rotates along with the rotation of the base; and a clamping pin is arranged on the bracket plate, wherein the clamping pin abuts against the gear, and when the gear rotates, the clamping pin collides with the gear and makes a sound.

3. The wireless charger according to claim 2, wherein the bracket plate is provided with a fixing block for fixing the clamping pin, the fixing block is provided with at least one fixing protrusion, and the clamping pin is provided with at least one fixing hole corresponding to the fixing protrusion;

and the clamping pin and the fixing block are detachably connected through the fixing protrusion and the fixing hole.

4. The wireless charger according to claim 3, wherein the bracket plate is formed with a first accommodating groove for accommodating the clamping pin and the fixing block, a clamping column is formed in the first accommodating groove, and a through hole corresponding to the clamping column is formed in the fixing block, and the clamping pin and the fixing block are arranged in the first accommodating groove.

5. The wireless charger according to claim 4, wherein the base comprises a base plate, wherein at least one first fixing column is arranged on the base plate, at least one screw hole A are arranged on the first fixing column, and at least one screw hole B corresponding to the screw hole A is arranged on the transfer plate, and the base plate and the transfer plate are fixedly connected by screws.

6. The wireless charger according to claim 5, wherein the base comprises a power receiver and an embedding block capable of accommodating the power receiver and the electric slip ring; and the base plate is provided with a power jack corresponding to the power receiver and a second accommodating groove capable of accommodating the embedding block; and the embedding block is provided with at least one embedding groove corresponding to the first fixing column, and the embedding block is arranged in the second accommodating groove.

7. The wireless charger according to claim 6, wherein the first charging module comprises a first circuit board, a first coil assembly, a first coil back plate for fixing the first coil assembly, and a top cover detachably connected with the first circuit board; and wherein, the top cover is provided with a third accommodating groove for accommodating the first coil assembly and the first coil back plate, the top cover is arranged on the first coil assembly and the first coil back plate, at least one back plate lug is arranged on the first coil back plate, screw holes C are arranged on the back plate lug, at least one threaded hole D corresponding to the screw holes C is arranged on the top cover, and the first coil back plate and the top cover are fixedly connected by screws.

8. The wireless charger according to claim 7, wherein the charger bracket comprises a bracket front plate and a bracket box body corresponding to the bracket front plate; and the placing groove body is arranged on the bracket front plate; and a second circuit board is arranged in the charger bracket; and a first charging plug and a first light-emitting element are arranged on the second circuit board; and a first exposure port corresponding to the first charging plug and a second exposure port corresponding to the first light-emitting element are arranged on the placing groove body, and the first charging plug penetrates through the first exposure port; and wherein, the second circuit board is provided with at least one threaded hole E, and the bracket front plate is provided with at least one threaded hole F corresponding to the threaded hole E, and the second circuit board and the bracket front plate are fixedly connected by screws.

9. The wireless charger according to claim 8, wherein a third circuit board and a mating board fixedly connected with the third circuit board are arranged at the top of the charger bracket, a first plug-in interface is arranged on the third circuit board, and a first access port corresponding to the first plug-in interface is arranged on the mating board; and wherein the third circuit board is provided with at least one threaded hole G, the bracket front plate is provided with at least one third fixing column corresponding to the threaded hole G, and a fitting plate is provided with a fixing groove corresponding to the third fixing column and a through hole H corresponding to the threaded hole G, wherein the third circuit board, the fitting plate and the bracket front plate are fixedly connected by screws.

10. The wireless charger according to claim 9, wherein the first circuit board is provided with a first switch key, the bracket box body is provided with a first power button corresponding to the first switch key and a third exposure port corresponding to the first power button, wherein the first power button penetrates through the third exposure port, and the bracket box body is also provided with a top cover opening corresponding to the top cover, and the top cover penetrates through the top cover opening.

11. The wireless charger according to claim 10, wherein the second charging module comprises a fourth circuit board, a second coil assembly, a second coil back plate for fixing the second coil assembly, and a battery; and the mobile phone charging panel comprises a mobile phone charging front plate and a mobile phone charging back plate corresponding to the mobile phone charging front plate; and a fourth accommodating groove for accommodating the second coil assembly and the second coil back plate is arranged on the mobile phone charging front plate, and the second coil assembly and the second coil back plate are arranged in the fourth accommodating groove.

12. The wireless charger according to claim 11, wherein the fourth circuit board is provided with a second plug-in interface, a third plug-in interface, a second switch key and a second light-emitting element; and the mobile phone charging front plate is provided with a second power button corresponding to the second switch key, a fourth exposure port corresponding to the second power button, a second access port corresponding to the second plug-in interface and a fifth exposure port corresponding to the second light-emitting element; and wherein, at least one screw hole I is arranged on the fourth circuit board, and at least one screw hole J corresponding to the screw hole I is arranged on the mobile phone charging front plate, and the fourth circuit board and the mobile phone charging front plate are fixedly connected by screws.

13. The wireless charger according to claim 12, wherein a first magnetic attraction piece and a second magnetic attraction piece are further arranged on the mobile phone charging front plate, and a fifth accommodating groove and a sixth accommodating groove for accommodating the first magnetic attraction piece and the second magnetic attraction piece are formed on the mobile phone charging front plate, wherein the first magnetic attraction piece is arranged in the fifth accommodating groove and the second magnetic attraction piece is arranged in the sixth accommodating groove.

14. The wireless charger according to claim 13, wherein the third charging module comprises a fifth circuit board, a third coil assembly, a third coil back plate, and a fixing plate for fixing the third coil assembly, wherein a coil groove is arranged on the fixing plate, and the third coil assembly is arranged in the coil groove; and wherein, the third charging module further comprises a third magnetic attraction piece and a fourth magnetic attraction piece, wherein the fixing plate and the third magnetic attraction piece are provided with a fourth circular slot and a fifth circular slot that are coaxial, and a frustum part is arranged on the third coil back plate, and the frustum part and the fourth magnetic attraction penetrate through the fourth circular slot and the fifth circular slot; and wherein, the watch charging panel comprises a watch charging front plate and a watch charging back plate corresponding to the watch charging front plate, and the watch charging front plate is provided with a seventh accommodating groove for accommodating the third coil assembly, the third coil back plate, the fixing plate, the third magnetic attraction piece and the fourth magnetic attraction piece, and the third coil assembly, the third coil back plate, the fixing plate, the third magnetic attraction piece and the fourth magnetic attraction piece are arranged in the seventh accommodating groove.

15. The wireless charger according to claim 14, wherein the watch charging back plate is provided with a regular circular through hole pattern, and an abutting plate is also provided, and the abutting plate is closely attached to the watch charging back plate; and wherein, a second charging plug is arranged on the fifth circuit board, a charging plug accommodating part which can allow the second charging plug to pass through is arranged on the watch charging front plate, and the second charging plug penetrates through the charging plug accommodating part.

16. A wireless charger, comprising:

a charger bracket provided with a first charging module, wherein the charger bracket has a substantially C-shaped cross section; and a mobile phone charging panel electrically connected with the charger bracket, wherein a second charging module is arranged on the mobile phone charging panel; and wherein, the charger bracket is provided with a placing groove body, the placing groove body accommodates the mobile phone charging panel, and the mobile phone charging panel is detachably arranged in the placing groove body; and a watch charging panel inserted into the charger bracket and electrically connected with the charger bracket, wherein a third charging module is arranged on the watch charging panel; and a base electrically connected with the charger bracket, wherein a power jack is arranged on the base, and the base is rotatably and electrically connected with the charger bracket; and wherein, the base comprises a transfer plate, a bearing is arranged on the transfer plate, the charger bracket comprises a bracket plate, a first circular slot and a second circular slot that are coaxial are arranged on the bracket plate and the transfer plate; and an electric slip ring is arranged on the bracket plate, and the electric slip ring penetrates through the first circular slot and the second circular slot and is fixedly connected with the transfer plate; and wherein, a gear is arranged in the first circular slot, and a third circular slot capable of passing through the electric slip ring is arranged on the gear; and the gear is sleeved on the electric slip ring through the third circular slot, and rotates along with the rotation of the base; and a clamping pin is arranged on the bracket plate, wherein the clamping pin abuts against the gear, and when the gear rotates, the clamping pin collides with the gear and makes a sound; and wherein the bracket plate is provided with a fixing block for fixing the clamping pin, the fixing block is provided with at least one fixing protrusion, and the clamping pin is provided with at least one fixing hole corresponding to the fixing protrusion; and the clamping pin and the fixing block are detachably connected through the fixing protrusion and the fixing hole; and wherein, the bracket plate is formed with a first accommodating groove for accommodating the clamping pin and the fixing block, a clamping column is formed in the first accommodating groove, and a through hole corresponding to the clamping column is formed in the fixing block; and the clamping pin and the fixing block are arranged in the first accommodating groove.

17. The wireless charger according to claim 16, wherein the charger bracket comprises a bracket front plate and a bracket box body corresponding to the bracket front plate, wherein at least one first buckle protrusion is arranged on the bracket box body, at least one first buckle lug corresponding to the first buckle protrusion is arranged on the bracket front plate, and a first buckle groove corresponding to the first buckle protrusion is arranged on the first buckle lug, wherein the bracket box body and the bracket front plate are detachably connected by buckling; and wherein, the bracket plate is provided with a second buckle lug corresponding to the first buckle protrusion, and a second buckle groove corresponding to the first buckle protrusion is provided on the second buckle lug, wherein the bracket plate and the bracket box body are detachably connected by buckling; and wherein, the bracket plate is provided with a second buckle protruding part, the bracket front plate is provided with a first buckle protrusion corresponding to the second buckle protruding part, and the first buckle protruding part is provided with a third buckle groove corresponding to the second buckle protruding part, wherein the bracket front plate and the bracket plate are detachably connected by buckling.

18. The wireless charger according to claim 16, wherein the mobile phone charging panel comprises a mobile phone charging front plate and a mobile phone charging back plate corresponding to the mobile phone charging front plate, wherein at least one first protruding storage groove is arranged on the mobile phone charging front plate, at least one fourth buckle groove is arranged on the first protruding storage groove, and at least one second buckling protruding part corresponding to the first protruding storage groove is arranged on the mobile phone charging back plate; and at least one third buckle protrusion corresponding to the fourth buckle groove is arranged on the second buckle protruding part, wherein the mobile phone charging front panel and the mobile phone charging back plate are detachably connected by buckling.

19. The wireless charger according to claim 16, wherein the watch charging panel comprises a watch charging front plate and a watch charging back plate corresponding to the watch charging front plate; and at least one third buckle protrusion is arranged on the watch charging back plate, and at least one fifth buckle groove is arranged on the third buckle protrusion; and a fourth buckle protrusion corresponding to the fifth buckle groove is arranged on the watch charging front plate, wherein the watch charging front plate and the watch charging back plate form a detachable connection by buckling.

* * * * *